US011639004B2

United States Patent
Khadivinassab et al.

(10) Patent No.: US 11,639,004 B2
(45) Date of Patent: May 2, 2023

(54) MECHANICAL HAND, USEFUL IN ROBOTICS

(71) Applicant: Sanctuary Cognitive Systems Corporation, Vancouver (CA)

(72) Inventors: Hatef Khadivinassab, Vancouver (CA); Connor Richard Shannon, Vancouver (CA); Kevin Jiaming Wu, Vancouver (CA); Matthew Steven Hill, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 358 days.

(21) Appl. No.: 17/098,716

(22) Filed: Nov. 16, 2020

(65) Prior Publication Data

US 2021/0146553 A1 May 20, 2021

Related U.S. Application Data

(60) Provisional application No. 62/937,044, filed on Nov. 18, 2019.

(51) Int. Cl.
*B25J 15/00* (2006.01)
*B25J 13/08* (2006.01)

(52) U.S. Cl.
CPC ......... *B25J 15/0009* (2013.01); *B25J 13/084* (2013.01); *B25J 13/086* (2013.01)

(58) Field of Classification Search
CPC .... B25J 15/0009; B25J 13/084; B25J 13/086; B25J 15/08; B25J 15/083; B25J 9/08; B25J 9/144

USPC ......................................................... 294/106
See application file for complete search history.

(56) References Cited

U.S. PATENT DOCUMENTS

| | | | | |
|---|---|---|---|---|
| 4,575,297 A * | 3/1986 | Richter | .................. | B25J 9/0006 414/730 |
| 4,740,126 A * | 4/1988 | Richter | ................ | B25J 15/0009 623/64 |
| 5,782,516 A * | 7/1998 | Partida | .................... | G11B 23/00 |
| 8,919,842 B2 * | 12/2014 | Ihrke | ........................ | B25J 15/12 901/29 |
| 2005/0121929 A1* | 6/2005 | Greenhill | ............... | B25J 9/1075 294/106 |
| 2007/0035143 A1* | 2/2007 | Blackwell | ................ | B25J 9/104 294/111 |

* cited by examiner

*Primary Examiner* — Paul T Chin
(74) *Attorney, Agent, or Firm* — Thomas Mahon

(57) ABSTRACT

A mechanical hand mimics a human hand having similar degrees of freedom and sensory abilities while appearing visually similar to human hand. The mechanical hand comprises a mechanical hand skeleton and resilient elastomer (e.g., silicone) skin that fully encloses the mechanical hand skeleton. The mechanical hand skeleton may advantageously be molded directly into the resilient elastomer (e.g., silicone) skin such that the hand appears, moves, and feels very similar to a real human hand. The mechanical hand may have applications in robotics, for example as an end-of-arm tool or end effector, or may have other applications. Robotic applications may include prosthetics applications.

30 Claims, 12 Drawing Sheets

MECHANICAL HAND, USEFUL IN ROBOTICS

TECHNICAL FIELD

The present disclosure generally relates to mechanical hands, for example mechanical hands useful for use in robotics.

BACKGROUND

Description of the Related Art

Robots or robotic appendages typically employ an end-of-arm tool or end effector to interact with objects in an environment in which the robot operates. Some end-of-arm tools or end effectors are relatively simple articles, without moving elements (e.g., push bar, hook, suction cup) allowing simple interactions or engagement (e.g., push, pull, lift) with objects in the environment. Other end-of-arm tools or end effectors are relatively complex machines, with moving elements (e.g., grippers, digits) allowing complex interactions or engagement (e.g., grasping) with objects in the environment.

As the field of robots develops, more sophisticated and/or robust end-of-arm tools or end effectors are desirable.

BRIEF SUMMARY

A mechanical hand mimics a human hand having similar degrees of freedom and sensory abilities while appearing visually similar to human hand. The mechanical hand comprises a mechanical hand skeleton and resilient elastomer (e.g., silicone) skin that fully encloses the mechanical hand skeleton. The mechanical hand skeleton may advantageously be molded directly into the resilient elastomer (e.g., silicone) skin such that the hand appears, moves, and feels very similar to a real human hand. The mechanical hand may have applications in robotics, for example as an end-of-arm tool or end effector, or may have other applications. Robotic applications may include prosthetics applications.

A mechanical hand may be summarized as comprising: a palm; at least three mechanical digits, each of the mechanical digits respectively comprised of at least three mechanical links, at least two curl joints, and having a tip and a base, the base of each of the mechanical digits coupled to the palm, the mechanical links of each pair of successive mechanical links along each of the mechanical digits between the tip and the base pivotally coupled to one another via a respective one of the at least two curl joints; a plurality of mechanical tendons, each of the mechanical tendons coupled to at least one of the mechanical links of the mechanical digits; and a skin of an elastic material that completely envelopes at least the palm and the mechanical digits.

The mechanical hand may further comprise: at least one sensor, the at least one sensor positioned at least proximate the tip of at least one of the mechanical digits, wherein the skin also completely envelopes the at least one sensor. The at least one sensor may be at least one of a pressure sensor or a proximity sensor. The mechanical hand may further comprise: at least one wire, the at least one wire electrically coupled to the at least one sensor, wherein the skin also completely envelopes the at least one wire. The at least one of wire may include an electrically insulative sleeve and extends at least to the palm.

The palm may have a proximate portion and a distal portion, the mechanical digits coupled at least proximate the distal portion of the palm, and further comprises: a mechanical wrist connection interface, the mechanical wrist connection interface coupled to or part of the distal portion of the palm.

The skin may also completely envelope the mechanical wrist connection interface.

The mechanical hand may further comprise: a plurality of tubes; and wherein each of the mechanical tendons are respectively comprised by at least one cable and the at least one cable is coupled to at least one of the mechanical links of the mechanical digits, each of the cables passing through at least one of the tubes, and wherein the skin also completely envelopes the tubes.

The mechanical hand may further comprise: a mechanical wrist connection interface, the mechanical wrist connection interface coupled to or part of a distal portion of the palm.

The palm may have a plane defined by a major face of the palm, and the curl joints of each of the mechanical digits that pivotally couple the links of each of the pair of links to one another each pivot about a respective axis that allow the tip of the respective mechanical digit to curl toward and away from the plane of the palm, For each of at least two of the mechanical digits, a respective plurality of sweep joints that pivotally couple the base of the respective mechanical digit to the palm to pivot the respective mechanical digit towards or away from one another, wherein the skin also completely envelopes the plurality of sweep joints, for example pivot about respective axes that are substantially (i.e., within 30 degrees) perpendicular to the plane of the palm.

Each sweep joint may be a respective flexure joint.

The mechanical hand may further comprise: for at least two of the at least three of the mechanical digits, at least one inter-digit joint that movably directly couples pairs of the mechanical digits to one another. Each inter-digit joint may be a respective flexure joint.

The mechanical hand may further comprise: for at least three of the mechanical digits, a respective plurality of sweep joints that pivotally couple the base of the respective mechanical digit to the palm to pivot the respective mechanical digit towards or away from one another, wherein the skin also completely envelopes the plurality of sweep joints.

The mechanical hand may further comprise: at least one of the palm or the mechanical digits comprise a plurality of through-holes and the skin extends through the through-holes to mechanically couple the skin to the at least one of the palm or the mechanical digits.

The skin may be a silicone skin molded directly about and through the palm and mechanical digits.

The curl joints of each of the mechanical digits that pivotally couple the links of each of the pair of links to one another may be a respective flexure joint. The curl joints of each of the mechanical digits that pivotally couple the links of each of the pair of links to one another may be a respective hinge joint with a respective pin.

At least three mechanical digits may comprises four mechanical fingers and a mechanical thumb coupled to the palm to move in opposition to the mechanical fingers.

The base of each of the mechanical digits may be coupled to the palm via a respective one of the curl joints of the mechanical digit and each curl joint that pivotally couples the base of the respective mechanical digit to the palm is a flexure joint. The base of each of the mechanical digits may be coupled to the palm via a respective one of the curl joints of the mechanical digit and each curl joint that pivotally couples the base of the respective mechanical digit to the palm is a hinge joint with a respective pin.

A method of manufacturing a mechanical hand comprises coupling at least three mechanical digits to a palm, each of the mechanical digits respectively comprised of at least two curl links, at least one joint, and having a tip and a base, the base of each of the mechanical digits coupled to the palm, the mechanical links of each pair of successive mechanical links along each of the mechanical digits between the tip and the base pivotally coupled to one another via a respective curl joint; coupling each of a plurality of tendons to at least one of the mechanical links of respective ones of the mechanical digits; and molding a skin of an elastic material with at least the palm and the mechanical digits in a mold to completely envelope at least the palm and the mechanical digits.

The method may further comprise: positioning at least one sensor at least proximate the tip of at least one of the mechanical digits, electrically coupling at least one wire electrically to the at least one sensor, and wherein the skin also completely envelopes the at least one sensor, and wherein molding a skin of an elastic material to completely envelope at least the palm and the mechanical digits includes molding a skin of silicone with at least the palm, the mechanical digits, and the at least one wire in the mold to completely envelope at least the palm, the mechanical digits, the at least one sensor and the at least one wire.

Each of the tendons may be respectively comprised by at least one cable, and the method may further comprise: providing a plurality of tubes; and passing each of the cables through at least one of the tubes, and wherein molding a skin of an elastic material to completely envelope at least the palm and the mechanical digits includes molding a skin of silicone with at least the palm, the mechanical digits, and the tubes in the mold to completely envelope at least the palm, the mechanical digits, and the tubes.

The method may further comprise: providing a mechanical wrist connection interface on the palm to which a mechanical wrist is coupleable to provide at least one degree of freedom of the palm with respect to the mechanical wrist, wherein molding a skin of an elastic material to completely envelope at least the palm and the mechanical digits includes molding a skin of silicone with at least the palm, the mechanical digits, and the mechanical wrist in the mold to completely envelope at least the palm, the mechanical digits, and the mechanical wrist.

The method may further comprise: providing a plurality of through-holes in at least one of the palm or mechanical digits such that the skin through into the through-holes to mechanically couple the skin to the at least one of the palm or the mechanical digits.

A mechanical hand may be summarized as comprising: a palm, having a finger side, a wrist side, a thumb side, a front face, and a back face, five mechanical digits, each of the mechanical digits respectively having at least two links and at least one joint, each mechanical digit having a tip on one end of the respective mechanical digit and a base another end of the respective mechanical digit, each mechanical digit coupled to the palm at the base of the mechanical digit, wherein four of the mechanical digits are mechanical fingers, the base of each of the mechanical fingers is coupled to the palm on the finger side, one of the mechanical digits is a mechanical thumb, the base of the mechanical thumb is coupled to the thumb side of the palm, and, wherein at least one set of the mechanical digits comprising at least one mechanical digit can be actuated in at least one degree of freedom, the at least one degree of freedom being a pitch of at least one joint of the at least one mechanical digit in each of the at least one set of mechanical digits; a plurality of spreading joints coupled to the palm allow the four mechanical fingers to spread apart from one another, such that each of at least three of the four mechanical fingers rotates around an axis normal to the back face of the palm; and an enveloping layer of an elastic material covering the digits, the palm, and the spreading joints, wherein the digits, the palm, and the spreading joints are embedded in the material.

The spreading joints may comprise: four finger attachment links to which the base of each mechanical finger is coupled to, at least three of the finger attachment links are rotatable finger attachment links coupled to the palm such that the finger attachment links can rotate around an axis normal to the face of the palm, at least three lever arms coupled to or part of the at least three rotatable finger attachment links extending from the at least three rotatable finger attachment links in a direction parallel to the front face of the palm, wherein each of the at least three lever arms is coupled to the palm through at least a primary lever link and a secondary lever link, and at least one lever link connector, the lever link connector coupled at a first end thereof to a secondary lever link of a first lever arm and at a second end thereof to a secondary lever link of a second lever arm, the first and the second lever arms being adjacent lever arms.

The mechanical hand may further comprise: a cable connection point coupled to or part of a first secondary lever link, a cable routing point coupled to or part of a second secondary lever link, a cable routed through the cable routing point and coupled to the cable connection point such that tension can be applied between the cable routing point and the cable connection point by tensioning the cable to control an amount of spreading between at least two of the mechanical fingers. The rotation of the mechanical fingers is such that at least one finger on a first end of the finger side of the palm rotates in the opposite direction to the direction that at least one finger on a second end on the finger side of the palm rotates.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed implementations and embodiments. However, one skilled in the relevant art will recognize that implementations and embodiments may be practiced without one or more of these specific details, or with other methods, components, materials, etc. In other instances, certain structures associated with robots, robotic appendages, linkages, and cables or actuators, have not been shown or described in detail to avoid unnecessarily obscuring descriptions of the implementations or embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one implementation" or "an implementation" or to "one embodiment" or "an embodiment" means that a particular feature, structure or characteristic described in connection with the implementation or embodiment is included in at least one implementation or embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

The terms "apparatus" and "mechanism" are used interchangeably herein.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Described herein is an example implementation of a mechanism or apparatus and methods for the manufacture of such mechanism or apparatus that approximates the functional and structural characteristics of a human hand. Those skilled in the art would recognize that many features of the implementation can be grouped together, split apart, reorganized, removed, or duplicated. While useful in robotics, for instance as a robotic appendage, the mechanism can be used in a large variety of other practical applications such as, for example, a prosthetic hand.

FIG. 1

Figure 1:
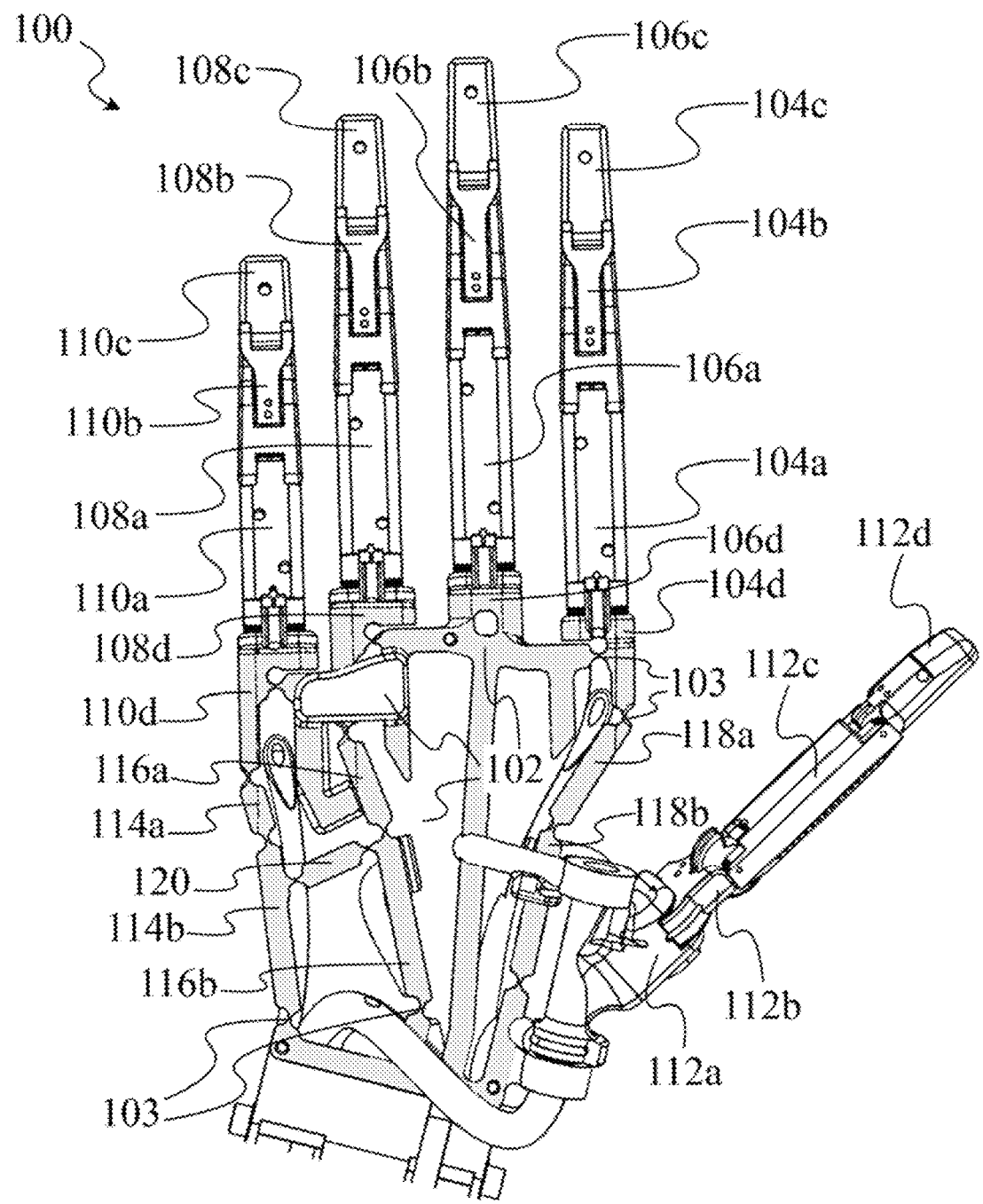
FIG. 1 is a back plan view of a mechanical hand skeleton according to at least one illustrated implementation, the mechanical hand skeleton including a palm and a plurality of mechanical digits and flexure joints, the mechanical digits including an index finger base rotatably coupled to the palm via a flexure joint to rotate around an axis approximately perpendicular to the palm, the mechanical hand skeleton illustrated in a relatively neutral or unspread or relaxed configuration in which at least some of the mechanical digits are not spread with respect to one another.

FIG. 1 illustrates a mechanical hand skeleton 100, according to at least one illustrated implementation.

The mechanical hand skeleton 100 comprises a palm 102 and a number of mechanical digits (e.g., mechanical fingers, mechanical thumb) moveably coupled to the palm 102.

An index finger base 104d is rotatably coupled to palm 102 through a flexure joint 103 (only a subset of the flexure joints are indicated on the figure to avoid unnecessary cluttering). The flexure joint 103 allows the index finger base 104d to rotate around an axis that is approximately perpendicular to a face of the palm 102. A first index finger link 104a is rotatably coupled to the index finger base 104d, a second index finger link 104b is rotatably coupled to the first index finger link 104a, and a third index finger link 104c is rotatably coupled to the second index finger link 104b, such that index finger links 104a, 104b, and 104c, form an index finger able to curl similarly to a human index finger. A first middle finger link 106a is rotatably coupled to a middle finger base 106d, which may be coupled to or part of the palm 102, a second middle finger link 106b is rotatably coupled to the first middle finger link 106a, and a third middle finger link 106c is rotatably coupled to the second middle finger link 106b, such that middle finger links 106a, 106b, and 106c, form a middle finger able to curl similarly to a human middle finger. A ring finger base 108d is rotatably coupled to the palm 102 through a flexure joint 103. The flexure joint 103 allows the ring finger base 108d to rotate around an axis approximately perpendicular to the face of the palm 102. A first ring finger link 108a is rotatably coupled to the ring finger base 108d a second ring finger link 108b, and a third ring finger link 108c such that ring finger links 108a, 108b, and 108c, form a ring finger able to curl similarly to a human ring finger. To the palm 102 is also rotatably coupled a pinky finger base 110d through a flexure joint 103 such that the pinky finger base 110d can rotate around an axis approximately perpendicular to the palm 102. To pinky finger base 110d is rotatably coupled a first pinky finger link 110a, a second pinky finger link 110b is rotatably coupled to the first pinky finger link 110a, and a third pinky finger link 110c is rotatably coupled to the second pinky finger link 110b, such that pinky finger links 110a, 110b, and 110c, form a pinky finger able to curl similarly to a human pinky finger. Finger bases 104d, 108d, and 110d are rotatably coupled to palm 102 such that each finger is able to rotate away from the middle finger, allow the fingers to be spread apart similar to the spreading of fingers in a human hand.

A thumb base 112a is pivotally coupled to the palm 102 such that the thumb base 112a can rotate around an axis approximately parallel to the palm 102, allowing the thumb base to mimic a flexion movement of a human thumb as an opposable digit to the fingers. A first thumb link 112b is rotatably coupled to the thumb base 112a such that the first thumb link 112b can rotate around an axis approximately perpendicular to the axis of rotation of the thumb base 112a allowing the first thumb link to mimic an abduction movement of a human thumb. A second thumb link 112c is rotatably coupled to the first thumb link 112b and a third thumb link 112d is rotatably coupled to the second thumb link 112c, such that the second and third thumb links 112c, 112d can curl towards the face of the palm 102 similarly to the curl of a human thumb.

Index finger base 104d is coupled to palm 102 through an index finger linkage comprising a first index linkage link 118a and a second index linkage link 118b with the index finger base 104d, the first index linkage link 118a, the second index linkage link 118b, and the palm 102 forming a planar one degree-of-freedom four bar index linkage with four links and four flexure joints 103 acting as rotational joints.

Ring finger base 108d is coupled to palm 102 through an ring finger linkage comprising a first ring linkage link 116a and a second ring linkage link 116b with the ring finger base 108d, the first ring linkage link 116a, the second ring linkage link 116b, and the palm 102 forming a planar one degree-of-freedom four bar ring linkage with four links and four flexure joints 103 acting as rotational joints.

Pinky finger base 110d is coupled to palm 102 through an pinky finger linkage comprising a first pinky linkage link 114a and a second pinky linkage link 114b with the pinky finger base 110d, the first pinky linkage link 114a, the second pinky linkage link 114b, and the palm 102 forming a planar one degree-of-freedom four bar pinky linkage with four links and four flexure joints 103 acting as rotational joints.

The second pinky linkage link 114b and the second ring finger linkage link 116b are further coupled together through a coupling link 120 that transforms the two planar four bar linkages into a planar one degree of freedom eight bar linkage comprising both the four bar pinky linkage and the four bar ring linkage. Further details regarding the operation of these linkages are illustrated in and described with reference to FIG. 3.

FIG. 2

Figure 2:
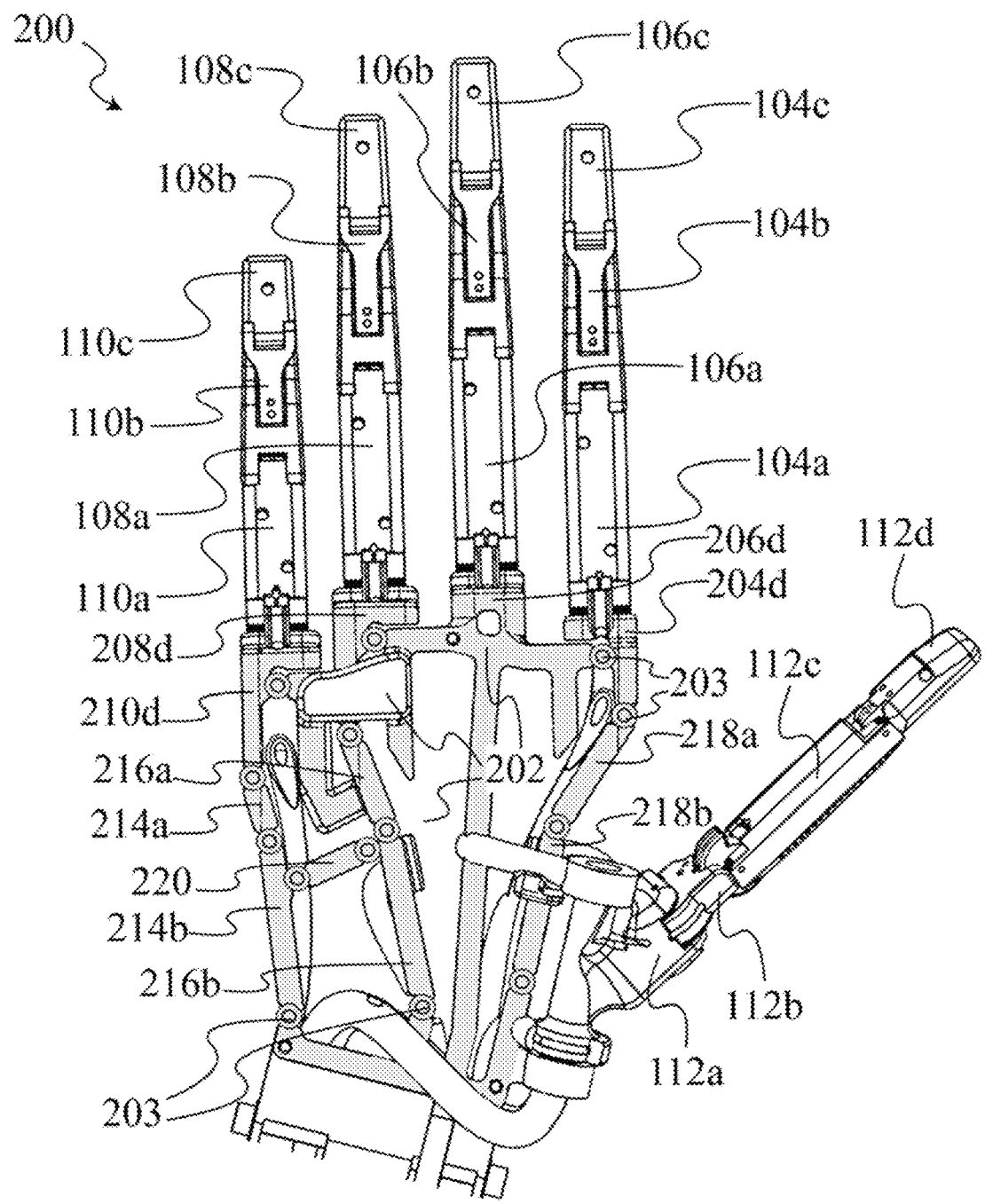
FIG. 2 is a back plan view of a mechanical hand skeleton according to at least one illustrated implementation, the mechanical hand skeleton including a palm and a plurality of mechanical digits and pin joints, the mechanical digits including an index finger base rotatably coupled to the palm via a pin joint to rotate around an axis approximately perpendicular to the palm, the mechanical hand skeleton illustrated in a relatively neutral or unspread or relaxed configuration in which at least some of the mechanical digits are not spread with respect to one another.

FIG. 2 illustrates a mechanical hand skeleton 200, according to at least one illustrated implementation. This implementation is similar to the implementation of a mechanical hand skeleton 100 (FIG. 1), although replaces the flexure joints 103 within the four and eight bar linkages with pin joints 203 (only a subset is indicated to avoid unnecessary cluttering). Other implementations may have a mixture of flexures and linkages, or may employ other types of joints. Structures in FIG. 2 that are identical or similar to corresponding structures in FIG. 1 are identified with the same reference numbers as in FIG. 1. Only significant differences are discussed below.

The palm 102, finger bases 104d, 106d, 108d, and 110d and the links 114-120 are replaced with a palm 202, finger bases 204d, 206d, 208d, and 210d and links 214-220 respectively which are similar in shape and function but coupled together through pin joints 203 instead flexure joints 103.

FIG. 3

Figure 3:
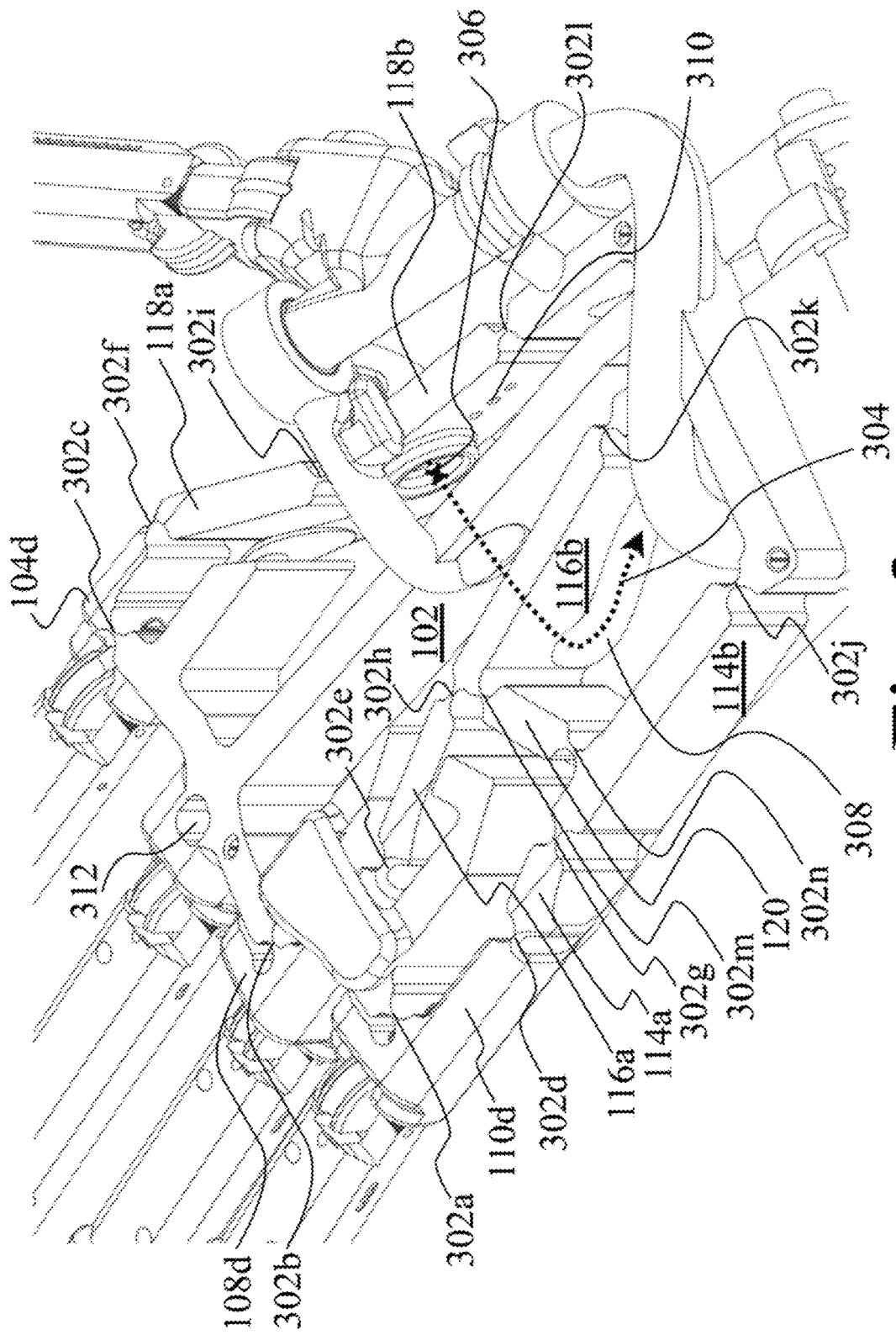
FIG. 3 is a back, left, bottom isometric view of a portion of the mechanical hand skeleton of FIG. 1, better illustrating various aspects thereof.

FIG. 3 shows a portion of the mechanical hand skeleton 100 of FIG. 1, better illustrating various structures thereof. In particular, FIG. 3 better illustrates rotational joints 302a-302m that couple together the three finger bases 104d, 108d, and 110d to the linkage links 116a, 116b, 118a, 118b, 114a, 114b, and 120, and palm 102. In this implementation the rotation joints 302a-302m are flexure joints, but other implementations (e.g., FIG. 2) may use pin joints or other rotation joints.

These linkages and joints allow for the actuation of a spreading motion of the fingers, similar to the spreading of human fingers. This spreading motion is actuated by coupling a tendon, for example a cable 305, to a connection point 306 on the second index linkage link 118b and threading the cable 305 along a tendon pathway (illustrated by broken line arrow) 304 at least partially delimited by a tube 308 or channel and into the palm 102. The cable 305 may be tensioned or pulled, and when the cable 305 is pulled, the second ring linkage link 116b and the second index linkage link 118b are pulled towards each other, rotating bout joints 302k and 302l respectively. This causes the index linkage to pull the index base 104d down, and the index base 104d to rotate around the joint 302c. Similarly, the movement of linkage link 116b causes the ring and pinky bases 108d and 110d to rotate around joints 302b and 302a respectively in such a way that the four fingers spread apart from one another. A restoring spring or similar bias mechanism (e.g., resilient elastomer) may be placed in a variety of places to restore the linkages to an un-spread or relaxed configuration from a spread or tensioned configuration when the tendon is relaxed, In the illustrated implementation, the restoring spring is placed between the second ring linkage link 116b and the second index linkage link 118b. Alternatively or additionally, an elastomer (e.g., silicone) skin which envelopes the mechanical hand skeleton 100, 200 may provide the restoring force and hence constitute a restoring spring member.

The palm 102 and spread mechanism may also have throughholes such as throughholes 310 and throughhole 312. These throughholes may advantageously provide points of mechanical connection between an elastomer (e.g., silicone) skin and the mechanical hand skeleton 100, 200 when the elastomer skin is applied to the mechanical hand skeleton 100, 200, for example via casting or molding the elastomer skin about or surrounding the mechanical hand skeleton 100, 200.

FIG. 4

Figure 4:
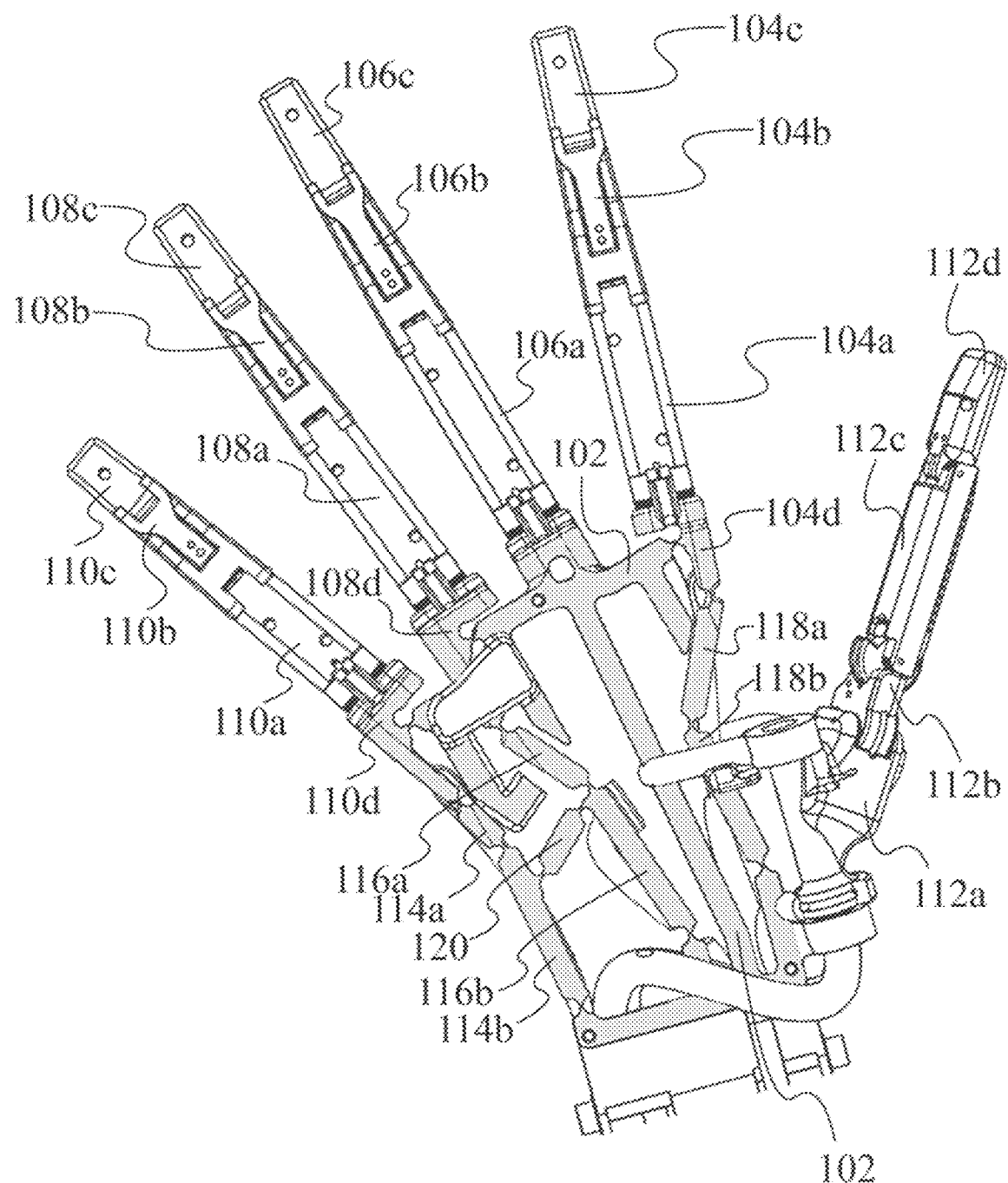
FIG. 4 is a back plan view of a mechanical hand skeleton of FIG. 1 illustrated in a relatively spread or tensioned configuration in which at least some of the mechanical digits are spread with respect to one another.

FIG. 4 shows the mechanical hand skeleton 100 illustrated with the spread mechanism engaged or tensioned and hence in a relatively spread or tensioned configuration in which at least some of the mechanical digits are spread with respect to one another. Linkage members 102, 104d, 108d, 110d, 114a, 114b, 116a, 116b, 118a, and 118b and the connected fingers are rotated and positioned as caused by the actuation of the mechanism as described in reference to FIG. 3.

FIG. 5

Figure 5:
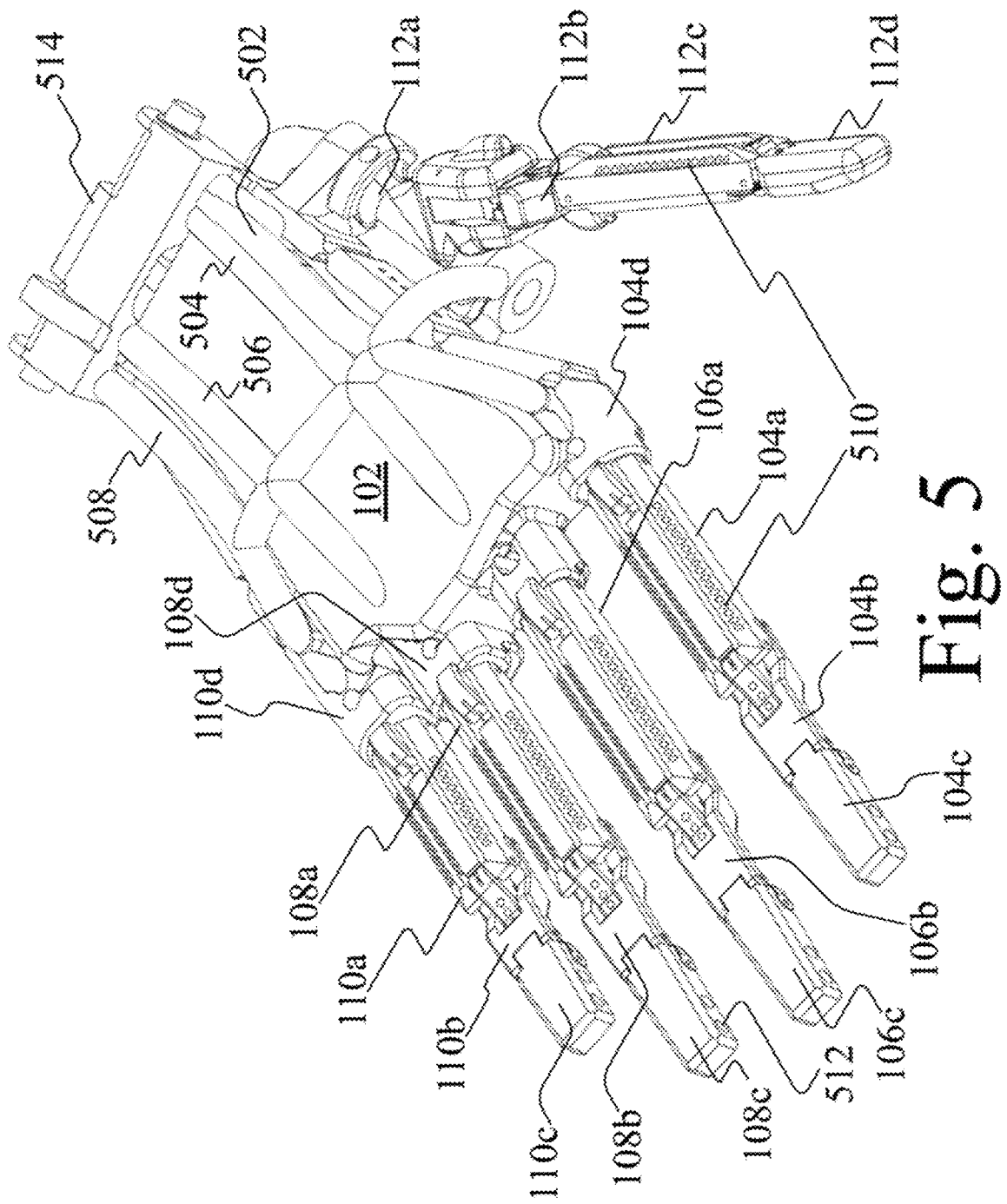
FIG. 5 is a front, right, top, isometric view of a mechanical hand skeleton of FIG. 1 illustrated in a relatively unspread or relaxed configuration.

FIG. 5 shows a back of the mechanical hand skeleton 100. In particular, a backside of the palm 102 is visible as are tendon cable tubes 502, 504, 506, and 508 which each holds a respective cable, movement of which actuates the curl degree of freedom of a respective one of the four fingers. A backside of each finger and of the thumb includes a series of throughholes 510 (only two called out to prevent clutter) which allow mechanical connection between the mechanical digits and an elastomer (e.g., silicone) skin (see FIG. 7) which envelopes the mechanical hand skeleton 100. Similarly, each of the fingers tips includes fingertip throughholes 512 (only one called out to prevent clutter) which allow a mechanical connection between the mechanical digits and an elastomer (e.g., silicone) skin (see FIG. 7) which envelopes the mechanical hand skeleton 100.

A wrist connection interface 514 provides a mechanical interface at which the palm 102 connects to a limb or robotic appendage. In at least some implementations, the palm 102 may be pivotally or rotatably connected to a limb or robotic appendage. In at least some implementations, the palm 102 may be removable pivotally or rotatably connected to a limb or robotic appendage, for example via a quick-release coupler (e.g., bayonet mount).

FIG. 6

Figure 6:
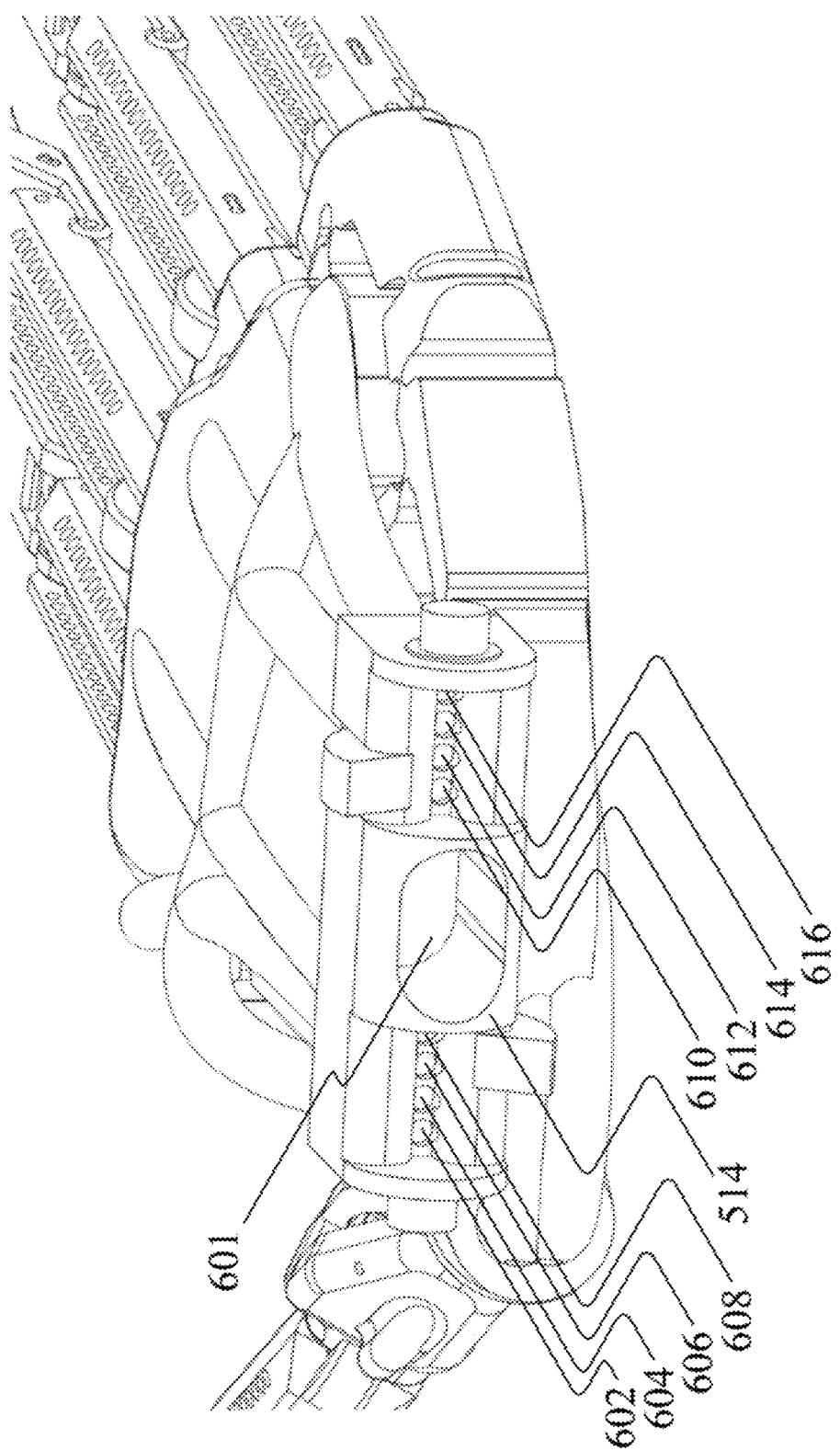
FIG. 6 is a bottom, front, left, isometric view of a mechanical hand skeleton of FIG. 1 or 2, better illustrating a wrist connection interface of the mechanical hand skeleton, according to at least one illustrated implementation.

FIG. 6 better illustrates aspects of the wrist connection interface 514 of the palm of the mechanical hand skeleton 100, 200. Wrist connection interface 514 includes a mechanical connection cutout 601 for connection with a wrist or other limb structure. The mechanical connection cutout 601 may also provide a conduit or passage to route sensor or electrical signal wiring or optical fiber therethrough. The wiring or optical fiber may communicatively couple one or more sensors (e.g., tactile sensors, pressure sensors, inductive sensors, capacitive sensors, thermal sensors, force sensors) on the mechanical hand to one or more processors or controllers that are part of a robot. Tendon cable connection ports 602-616 are entry points for cables that connect to the various actuation degrees of freedom of the hand, including the curl of the four fingers, the curl, flexion, and abduction degrees of freedom of the thumb, and the finger spread mechanism. The cables may be attached to actuators (e.g., electric motors, solenoids, pneumatic or hydraulic pistons) that are part of a robot.

FIG. 7

Figure 7:
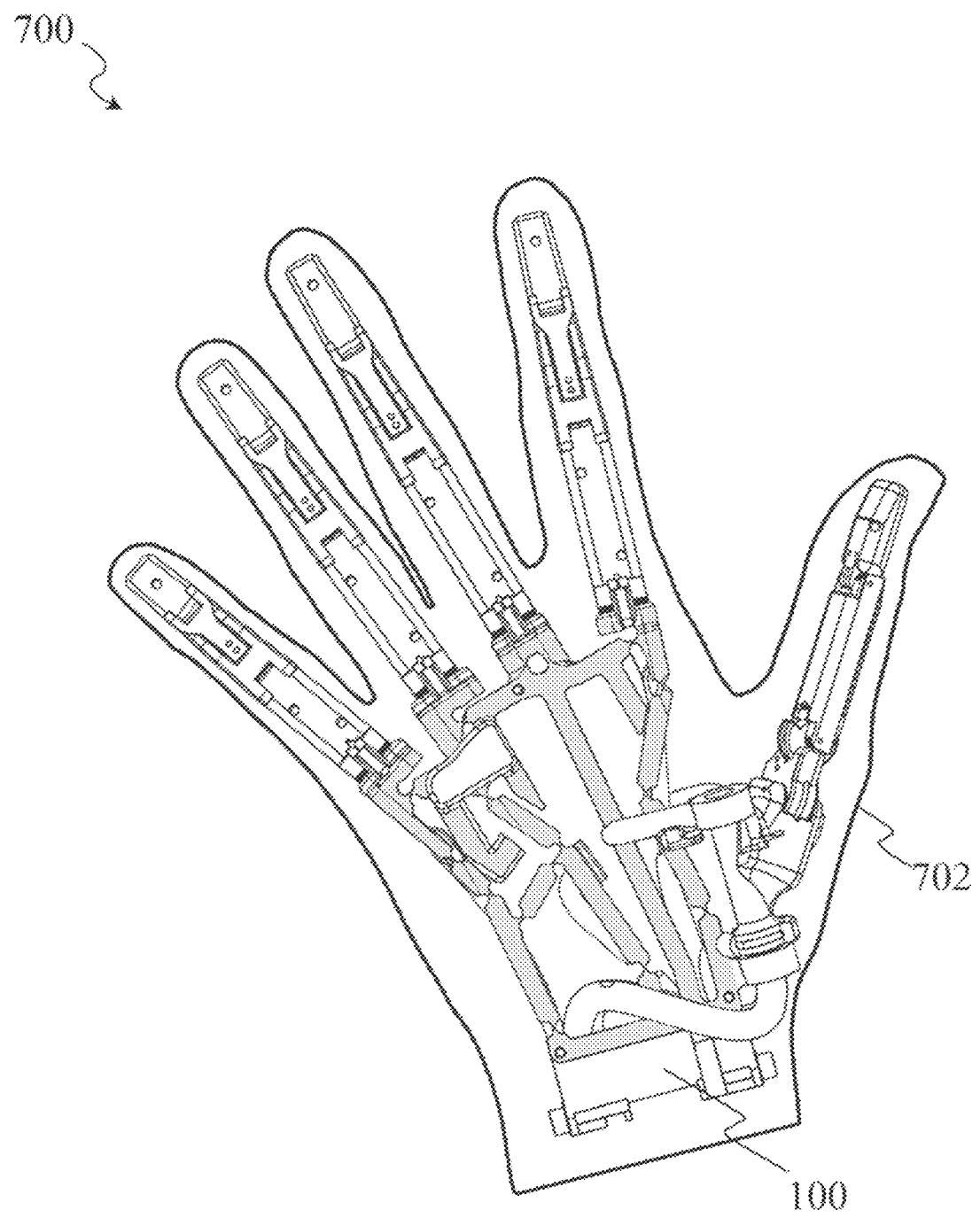
FIG. 7 is a back plan view of a mechanical hand according to at least one illustrated implementation, the mechanical hand comprising mechanical hand skeleton cast in an elastomeric material (e.g., silicone) according to at least one illustrated implementation, the elastomeric material illustrated as transparent to better illustrated the placement of the mechanical hand skeleton therein.

FIG. 7 shows a mechanical hand 700 comprising a mechanical hand skeleton 100 after casting in an elastomer (e.g., silicone). The mechanical hand skeleton 100 is fully enveloped and imbedded in a soft elastomer skin 702 that is cast with the mechanical hand skeleton 100 in place. The elastomer skin is preferably silicone. The method for creating this skinned mechanical hand 700 includes suspending a mechanical hand skeleton 100, 200 with required tendons, sensors, and electronics attached in a mold, the mold having an internal cavity with a shape that resembles a human hand. The elastomer (e.g., a liquid silicone mixture) is then introduced (e.g., poured, pumped) into the internal cavity of the mold, cover the exterior surfaces of the mechanical hand skeleton 100, 200 as well as entering into various cavities and openings between components of the mechanical hand skeleton 100, 200. The elastomer is then cured (e.g., catalyzed, heated, exposed to ultraviolet light, etc.) to form the elastomer skin.

FIG. 8

Figure 8:
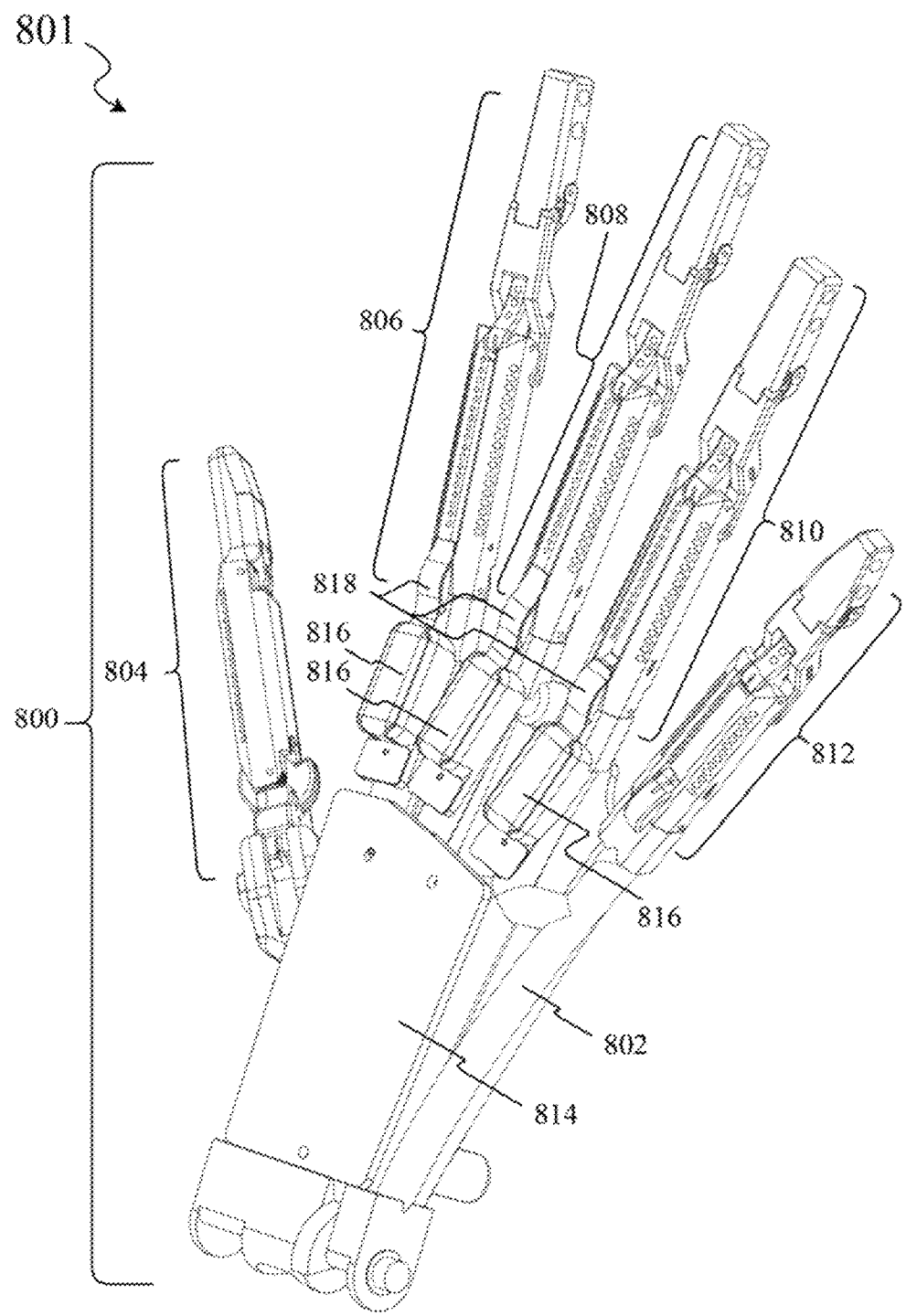
FIG. 8 is a front, right isometric view of a mechanical hand skeleton according to at least one illustrated implementation, the mechanical hand skeleton including a palm and a plurality of mechanical digits and flexure joints, the mechanical digits including an index finger base rotatably coupled to the palm via a flexure joint to rotate around an axis approximately perpendicular to the palm, the mechanical hand skeleton illustrated in a relatively spread or tensioned configuration in which at least some of the mechanical digits are spread apart with respect to one another.

FIG. 8 shows a mechanical hand 801 that includes a mechanical hand skeleton 800 and electrical and/or electronic components (i.e., circuitry). This implementation of the mechanical hand skeleton 800 omits a spread mechanism, but otherwise has a largely similar mechanical structure to other ones of the described implementations. For example, the mechanical hand skeleton 800 includes a palm 802, a thumb 804, an index finger 806, a middle finger 808, a ring finger 810, and a pinky finger 812. Notably, each of the index, middle, and ring fingers 806, 808, 810 have a respective ribbon cable box 816 coupled to their base. The ribbon cable boxes 816 hold excess lengths of electrical ribbon cables 818 which are communicatively coupled to sensors carried by the index, middle, and ring fingers 806, 808, 810. The ribbon cables 818 may naturally retract back into the ribbon cable boxes 816 due to bending stresses in the ribbon cables 818 when the finger is relaxed or may have a spring or other bias mechanism, for instance where the ribbon cables 818 are resilient. Other implementations may have similar ribbon cable boxes on the pinky finger base or thumb base, or may have ribbon cable box on some other combination of fingers. Coupled to the back of the palm 802 is a first printed circuit board 814. The first printed circuit board 814 may carry sensors (e.g., pressure sensors, temperature sensors, force sensors, inductive or capacitive touch sensors), for instance to detect interactions of the palm with various objects, and/or electronic processors or controllers operable to collect and processor sensor data from sensors carried by the fingers, thumb, and other printed circuit boards. The first printed circuit board 814 may carry one or more communications ports wired operable to and transmit raw or processed senor data to other systems (e.g., a robot control system). The communications ports may take the form of wired (e.g., electrical, optical) and/or wireless (e.g., radio and antenna) communications ports.

FIG. 9

Figure 9:
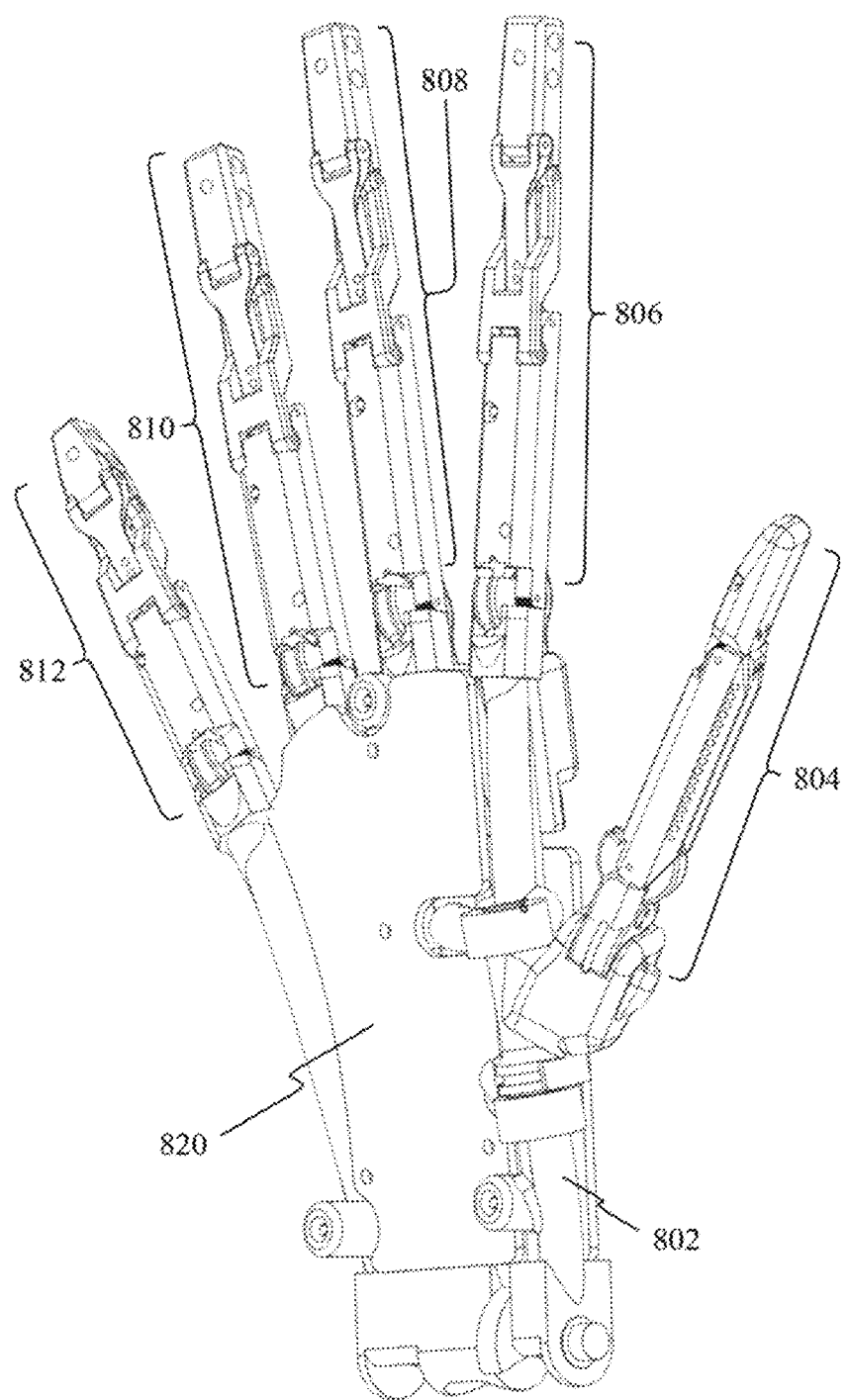
FIG. 9 is a back, left isometric view of the mechanical hand skeleton of FIG. 8, better illustrating various portions thereof.

FIG. 9 shows the mechanical hand 801 from the obverse side to that of FIG. 8. As visible in FIG. 9, the mechanical hand 801 includes a second printed circuit board 820. The second printed circuit board 820 may hold sensors (e.g., pressure sensors, temperature sensors, force sensors, inductive or capacitive touch sensors) and electronic processors operable to collect and/or process sensor data from sensors carried by the fingers, thumb, and boards. The second printed circuit board 820 may carry one or more communications ports operable to transmit raw or processed sensor data to other systems (e.g., a robot control system). The communications ports may take the form of wired (e.g., electrical, optical) and/or wireless (e.g., radio and antenna) communications ports. The second printed circuit board 820 may be communicatively coupled to the first printed circuit board 816 to allow for centralized processing or transmitting of sensor data.

FIG. 10

Figure 10:
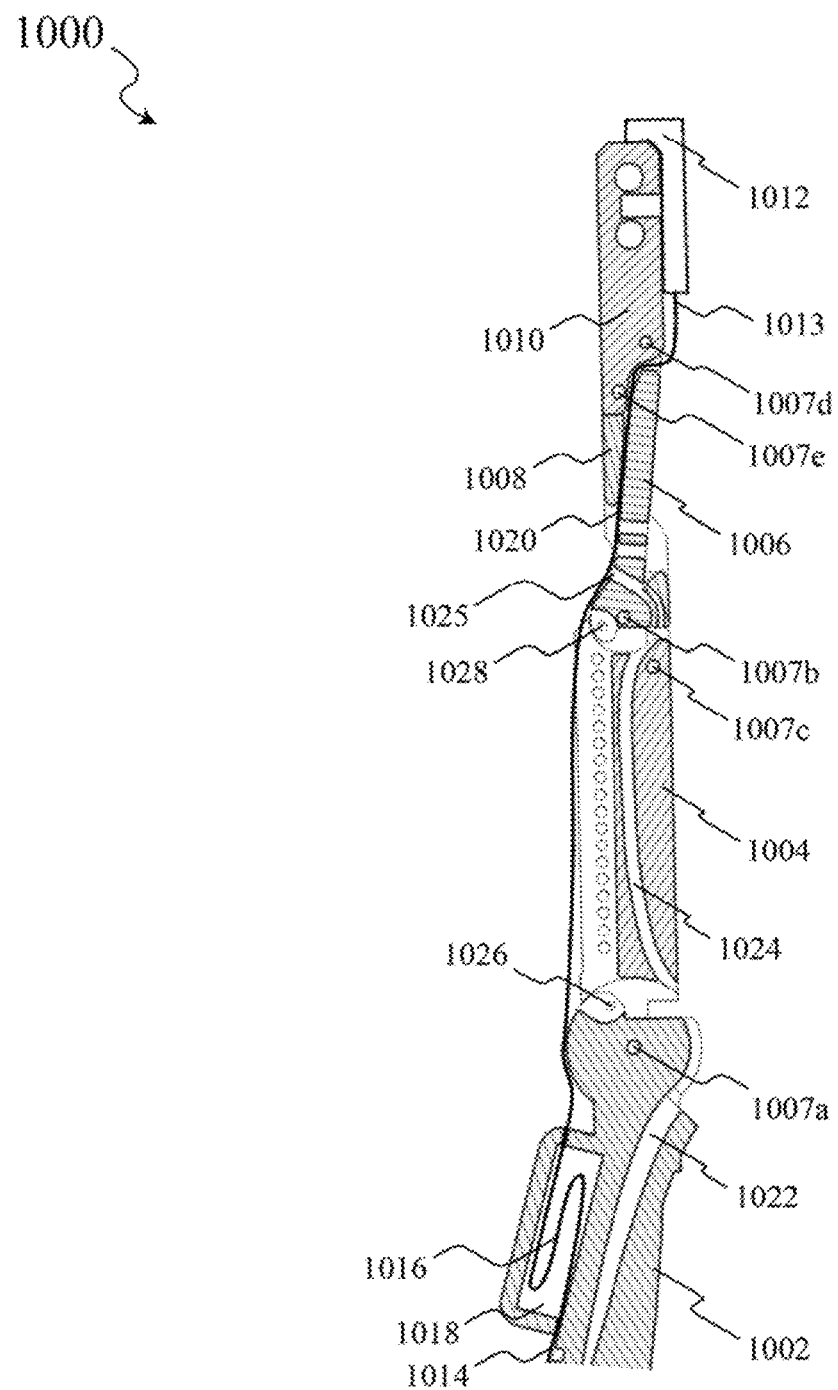
FIG. 10 is a cross-sectional view of a finger digit of a mechanical hand skeleton according to at least one illustrated implementation, the cross section taken along a plane that passes through a longitudinal axis of the finger digit.

FIG. 10 depicts a cross-sectional view of an example implementation of a mechanical finger 1000 that may be used as any of the index, middle, ring, or pinky fingers as previously illustrated and described. The illustrated mechanical finger 1000 comprises a finger base 1002, first finger link 1004, second finger link 1006, finger curl link 1008 and fingertip 1010. The finger base 1002 supports the mechanical finger 1000 from the palm (not illustrated in FIG. 10). Alternatively, in some implementations, the finger base 1002 may be part of the palm. The first finger link 1004 is coupled to the finger base 1002, the second finger link 1006 is coupled to the first finger link 1004 and the finger curl link 1008 is coupled to the second finger link 1006. Both the second finger link 1006 and the finger curl link 1008 are coupled to the fingertip 1010. The first finger link 1004 is pinned to the finger base 1002 at pin joint 1007a to allow pivoting or rotation thereabout. The second finger link 1006 is pinned to the first finger link at pin joint 1007b to allow pivoting or rotation thereabout. The fingertip 1010 is pinned to the second finger link 1006 at pin joint 1007d. The finger curl link 1008 is pinned to the first finger link at pin joint 1007c and is pinned to the fingertip 1010 at pin joint 1007e.

A sensor (e.g., pressure sensor, temperature sensor, force sensor, inductive or capacitive touch sensor) 1012 is coupled to the fingertip 1010. The sensor 1012 is coupled to a ribbon cable 1013 which carries power and electrical signals and information both to and from the sensor 1012. The ribbon cable 1013 may begin at the base of the finger at 1014 passes through a cavity 1018 and exits the cavity 1018 towards the remainder of the mechanical finger 1000. The ribbon cable 1013 has some extra length 1016 (e.g., folded) held by the cavity 1018. The ribbon cable 1013 extends from the cavity 1018 to the second finger link 1006, and threads between the second finger link 1006 and the finger curl link 1008. The ribbon cable 1013 extends out to the front of the fingertip 1010 where the ribbon cable 1013 communicative couples to the sensor 1012. The extra length 1016 in the ribbon cable 1013 ensures that there is sufficient extra length to extend the ribbon cable 1013 with the finger links when the finger links curl.

The curling of the mechanical finger 1000 is actuated via a cable. The cable may be threaded through a path in the finger base 1022, around a cylindrical surface, along a path through the first finger link 1024, and around a cylindrical surface on the second finger link, and attached to an attachment point 1025 on the second finger link 1006. Tensioning of the cable shortens a path the cable takes through the mechanical finger 100, causing the first finger link 1004 to rotate clockwise around the pin joint 1007a to shorten the path around the cylindrical surface. Tensioning of the cable also causes the second finger link 1006 to rotate clockwise around pin joint 1007b. The rotation of the second finger link actuates the four-bar linkage formed by links 1004, 1006, 1008, and 1010, causing that the fingertip 1010 to rotate clockwise. A spring or other bias member can be coupled between connection points 1026 and 1028 on the finger base 1002 and second finger link 1006 respectively, to apply a restorative force to return the finger to the neutral or relaxed position when tension is removed from the cable.

FIG. 11

Figure 11:
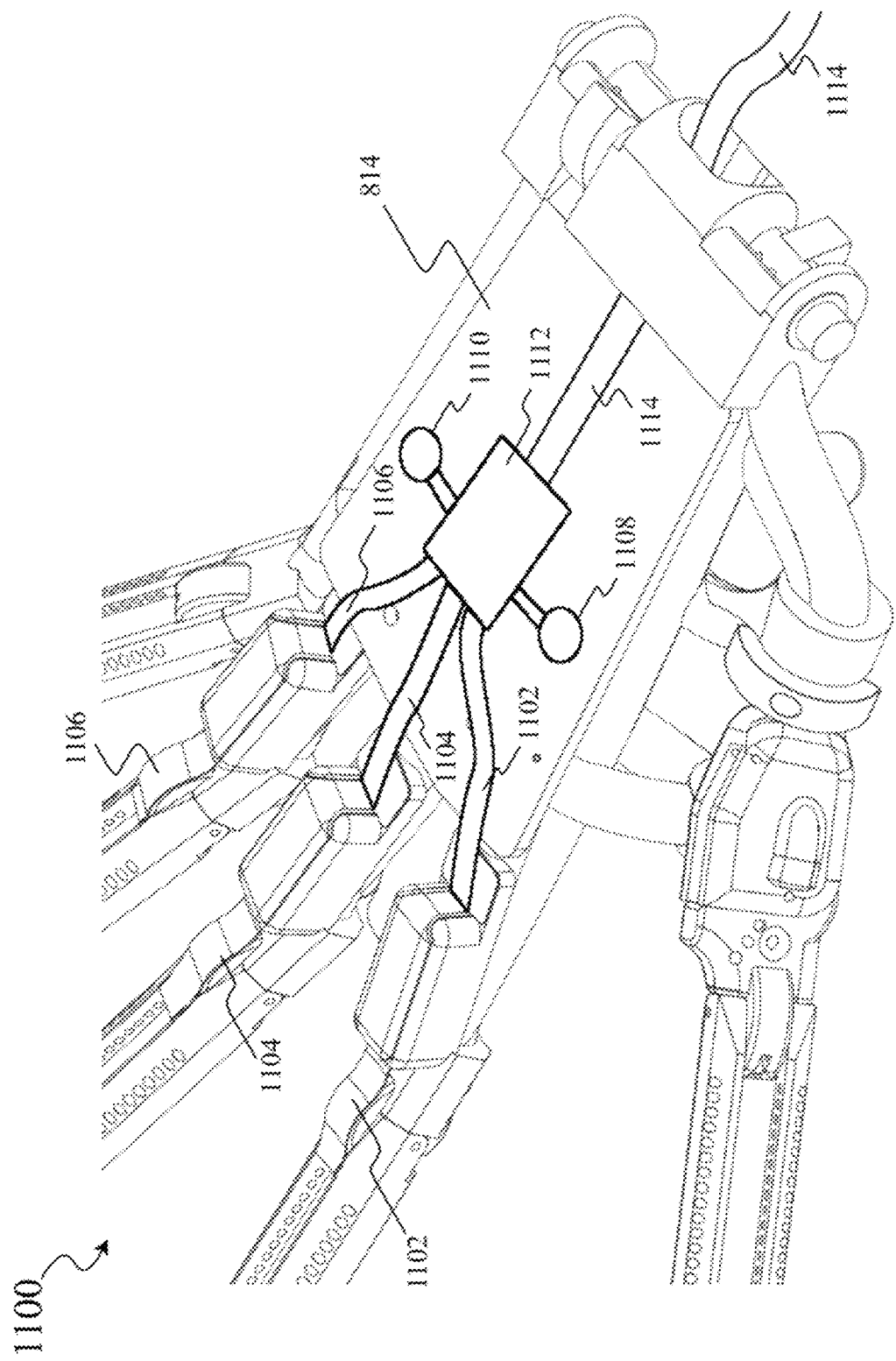
FIG. 11 is a front, left, bottom isometric view of a portion of a mechanical hand skeleton according to at least one illustrated implementation, illustrating a plurality of finger sensor modules, a first printed circuit board, and ribbon cables providing communicative coupling between first printed circuit board and the finger sensor modules.

FIG. 11 shows a portion of a mechanical hand skeleton 1100 with three ribbon cable boxes 816, three electrical ribbon cables 1102, 1104, 1106, and the first printed circuit board 814. The illustrated implementation comprises three ribbon cables 1102, 1104, and 1106 which communicatively couple three fingers sensors (not visible in FIG. 11) with a controller or processor 1112 (e.g., micro-controller, microprocessor, application specific integrated circuit, digital signal processor, graphic processing unit, field programmable gate array, programmed logic controller) carried by the first printed circuit board 814. In some implementations, the first printed circuit board 814 may also carry or bear one or more sensors (e.g., pressure sensors, temperature sensors, force sensors, inductive or capacitive touch sensors) 1108 and 1110 communicatively coupled with the controller or processor 1112. The processor 1112 may be communicatively coupled to one or more external systems, for example via a communications cable 1114. The processor 1112 may also be communicatively coupled to other sensors, for example sensors positioned on the palm, thumb, fingers, or carried by other printed circuit boards.

FIG. 12

Figure 12:
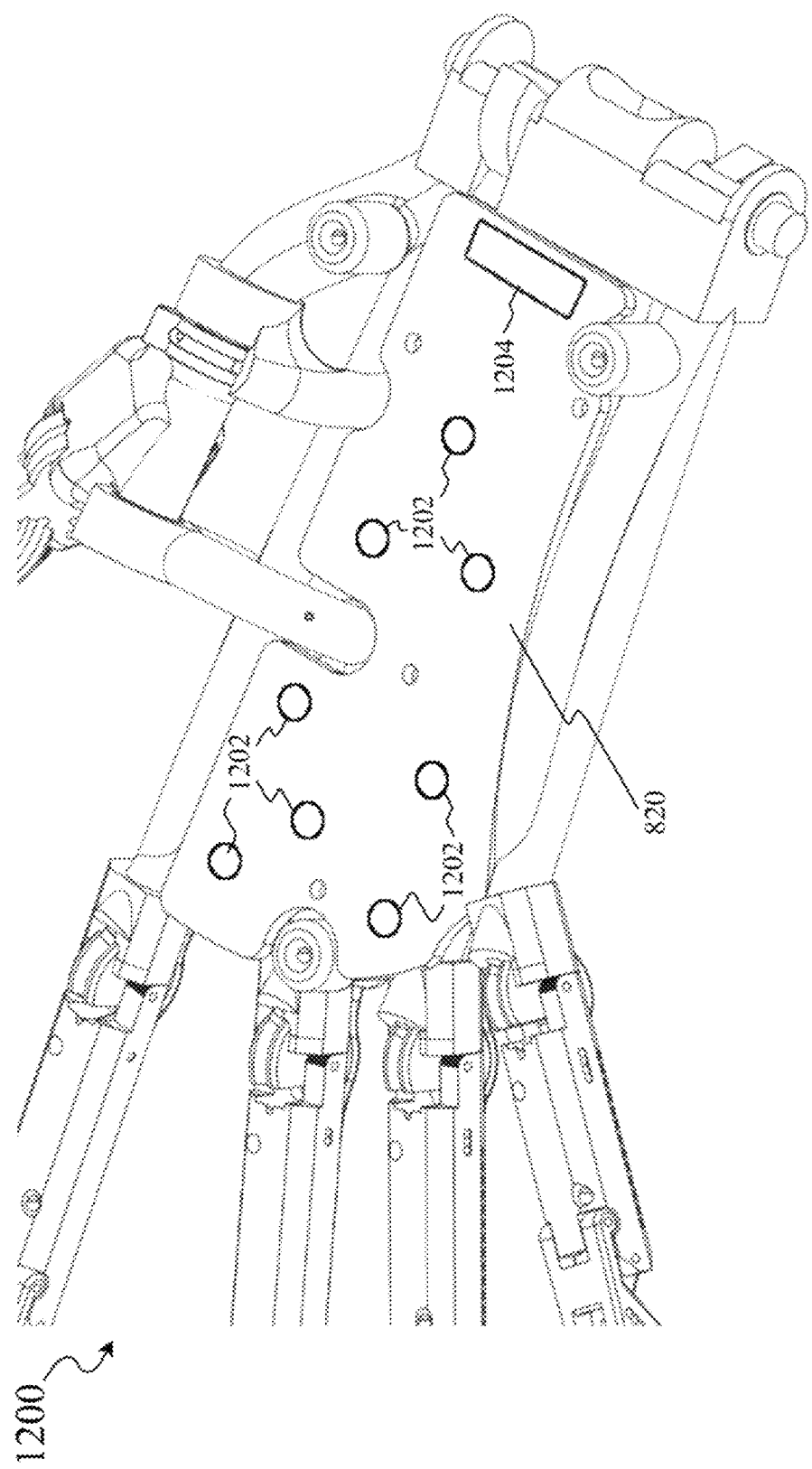
FIG. 12 is a back, right, bottom isometric view of a portion of a mechanical hand skeleton according to at least one illustrated implementation, illustrating a plurality of finger sensor modules, a second printed circuit board that bears a number of pressure or touch sensor modules and a controller or processor communicatively coupled to the pressure or touch sensor modules.

FIG. 12 shows a portion of a mechanical hand skeleton 1200 with the second printed circuit board 820. The illustrated implementation comprises a number of sensors 1202 (e.g., pressure sensor, force sensor, inductive or capacitive touch sensors) coupled to a controller or processor 1204 (e.g., micro-controller, microprocessor, application specific integrated circuit, digital signal processor, graphic processing unit, field programmable gate array, programmed logic controller) carried by the second printed circuit board 820. The processor 1204 may be communicatively coupled to one or more external systems or to other circuit boards attached to the mechanical hand skeleton 1200. The processor 1204 may also be communicatively coupled to other sensors carried by the palm, thumb, fingers, or other printed circuit boards such as first printed circuit board 814.

The various implementations and embodiments described above can be combined to provide further implementations and embodiments. Various changes can be made to the implementations and embodiments in light of the above-detailed description. For example, the described methods may include additional acts, omit some acts, and/or perform acts in a different order. Various methods or operations may be performed across multiple processors, which may be in a distributed environment. Various changes can be made to the implementations and embodiments in light of the above-detailed description. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Application No. 62/937,044, filed Nov. 18, 2019 are incorporated herein by reference, in their entirety. Aspects of the embodiments can be modified, if necessary, to employ systems, circuits and concepts of the various patents, applications and publications to provide yet further embodiments.

In general, in the following claims, the terms used should not be construed to limit the claims to the specific implementations and embodiments disclosed in the specification and the claims, but should be construed to include all possible implementations and embodiments along with the full scope of equivalents to which such claims are entitled. Accordingly, the claims are not limited by the disclosure.

The terms "approximately equal", "approximately parallel", approximately perpendicular" as may be used in the description and claims to compare or relate two or more entities, encompass variations to the described entities that are similar enough to have the same or similar functionality.

The invention claimed is:

1. A mechanical hand, comprising:
 a palm;
 at least three mechanical digits, each of the mechanical digits respectively comprised of at least three mechanical links, at least two curl joints, and having a tip and a base, the base of each of the mechanical digits coupled to the palm, the mechanical links of each pair of successive mechanical links along each of the mechanical digits between the tip and the base pivotally coupled to one another via a respective one of the at least two curl joints;
a plurality of mechanical tendons, each of the mechanical tendons coupled to at least one of the mechanical links of the mechanical digits; and
a skin of an elastic material that completely envelopes at least the palm and the mechanical digits.

2. The mechanical hand of claim 1, further comprising:
at least one sensor, the at least one sensor positioned at least proximate the tip of at least one of the mechanical digits, wherein the skin also completely envelopes the at least one sensor.

3. The mechanical hand of claim 2 wherein the at least one sensor is at least one of a pressure sensor or a proximity sensor.

4. The mechanical hand of claim 1, further comprising:
at least one wire, the at least one wire electrically coupled to the at least one sensor, wherein the skin also completely envelopes the at least one wire.

5. The mechanical hand of claim 4 wherein the at least one of wire includes an electrically insulative sleeve and extends at least to the palm.

6. The mechanical hand of claim 1 wherein the palm has a proximate portion and a distal portion, the mechanical digits coupled at least proximate the distal portion of the palm, and further comprising:
a mechanical wrist connection interface, the mechanical wrist connection interface coupled to or part of the distal portion of the palm.

7. The mechanical hand of claim 6 wherein the skin also completely envelopes the mechanical wrist connection interface.

8. The mechanical hand of claim 1, further comprising:
a plurality of tubes; and wherein
each of the mechanical tendons are respectively comprised by at least one cable and the at least one cable is coupled to at least one of the mechanical links of the mechanical digits, each of the cables passing through at least one of the tubes, and wherein the skin also completely envelopes the tubes.

9. The mechanical hand of claim 8, further comprising:
a mechanical wrist connection interface, the mechanical wrist connection interface coupled to or part of a distal portion of the palm.

10. The mechanical hand of claim 1 wherein the palm has a plane defined by a major face of the palm, and the curl joints of each of the mechanical digits that pivotally couple the links of each of the pair of links to one another each pivot about a respective axis that allow the tip of the respective mechanical digit to curl toward and away from the plane of the palm, and further comprising:
for each of at least two of the mechanical digits, a respective plurality of sweep joints that pivotally couple the base of the respective mechanical digit to the palm to pivot the respective mechanical digit towards or away from one another, wherein the skin also completely envelopes the plurality of sweep joints.

11. The mechanical hand of claim 10 wherein each sweep joint is a respective flexure joint.

12. The mechanical hand of claim 10, further comprising:
for at least two of the at least three of the mechanical digits, at least one inter-digit joint that movably directly couples pairs of the mechanical digits to one another.

13. The mechanical hand of claim 12 wherein each inter-digit joint is a respective flexure joint.

14. The mechanical hand of claim 10 wherein the base of each of the mechanical digits is coupled to the palm via a respective one of the curl joints of the mechanical digit and each curl joint that pivotally couples the base of the respective mechanical digit to the palm is a flexure joint.

15. The mechanical hand of claim 10 wherein the base of each of the mechanical digits is coupled to the palm via a respective one of the curl joints of the mechanical digit and each curl joint that pivotally couples the base of the respective mechanical digit to the palm is a hinge joint with a respective pin.

16. The mechanical hand of claim 1, and further comprising:
for at least three of the mechanical digits, a respective plurality of sweep joints that pivotally couple the base of the respective mechanical digit to the palm to pivot the respective mechanical digit towards or away from one another, wherein the skin also completely envelopes the plurality of sweep joints.

17. The mechanical hand of claim 1, further comprising:
at least one of the palm or the mechanical digits comprise a plurality of through-holes and the skin extends through the through-holes to mechanically couple the skin to the at least one of the palm or the mechanical digits.

18. The mechanical hand of claim 1 wherein the skin is a silicone skin molded directly about and through the palm and mechanical digits.

19. The mechanical hand of claim 1 wherein the curl joints of each of the mechanical digits that pivotally couple the links of each of the pair of links to one another is a flexure joint.

20. The mechanical hand of claim 1 wherein the curl joints of each of the mechanical digits that pivotally couple the links of each of the pair of links to one another is a hinge joint with a respective pin.

21. The mechanical hand of claim 1 wherein the at least three mechanical digits comprises four mechanical fingers and a mechanical thumb coupled to the palm to move in opposition to the mechanical fingers.

22. A method of manufacturing a mechanical hand, the method comprising:
coupling at least three mechanical digits to a palm, each of the mechanical digits respectively comprised of at least two curl links, at least one joint, and having a tip and a base, the base of each of the mechanical digits coupled to the palm, the mechanical links of each pair of successive mechanical links along each of the mechanical digits between the tip and the base pivotally coupled to one another via a respective curl joint;
coupling each of a plurality of tendons to at least one of the mechanical links of respective ones of the mechanical digits; and
molding a skin of an elastic material with at least the palm and the mechanical digits in a mold to completely envelope at least the palm and the mechanical digits.

23. The method of claim 22, further comprising:
positioning at least one sensor at least proximate the tip of at least one of the mechanical digits,
electrically coupling at least one wire electrically to the at least one sensor, and wherein the skin also completely envelopes the at least one sensor, and
wherein molding a skin of an elastic material to completely envelope at least the palm and the mechanical digits includes molding a skin of silicone with at least the palm, the mechanical digits, and the at least one wire in the mold to completely envelope at least the palm, the mechanical digits, the at least one sensor and the at least one wire.

24. The method of claim 22 wherein each of the tendons respectively comprised by at least one cable, and further comprising:
   providing a plurality of tubes; and
   passing each of the cables through at least one of the tubes, and wherein molding a skin of an elastic material to completely envelope at least the palm and the mechanical digits includes molding a skin of silicone with at least the palm, the mechanical digits, and the tubes in the mold to completely envelope at least the palm, the mechanical digits, and the tubes.

25. The method of claim 22, further comprising:
   providing a mechanical wrist connection interface on the palm to which a mechanical wrist is coupleable to provide at least one degree of freedom of the palm with respect to the mechanical wrist, wherein molding a skin of an elastic material to completely envelope at least the palm and the mechanical digits includes molding a skin of silicone with at least the palm, the mechanical digits, and the mechanical wrist in the mold to completely envelope at least the palm, the mechanical digits, and the mechanical wrist.

26. The method of claim 22, further comprising:
   providing a plurality of through-holes in at least one of the palm or mechanical digits such that the skin through into the through-holes to mechanically couple the skin to the at least one of the palm or the mechanical digits.

27. A mechanical hand, comprising:
   a palm, having a finger side, a wrist side, a thumb side, a front face, and a back face,
   five mechanical digits, each of the mechanical digits respectively having at least two links and at least one joint, each mechanical digit having a tip on one end of the respective mechanical digit and a base another end of the respective mechanical digit, each mechanical digit coupled to the palm at the base of the mechanical digit, wherein four of the mechanical digits are mechanical fingers, the base of each of the mechanical fingers is coupled to the palm on the finger side, one of the mechanical digits is a mechanical thumb, the base of the mechanical thumb is coupled to the thumb side of the palm, and, wherein at least one set of the mechanical digits comprising at least one mechanical digit can be actuated in at least one degree of freedom, the at least one degree of freedom being a pitch of at least one joint of the at least one mechanical digit in each of the at least one set of mechanical digits;
   a plurality of spreading joints coupled to the palm allow the four mechanical fingers to spread apart from one another, such that each of at least three of the four mechanical fingers rotates around an axis normal to the back face of the palm; and
   an enveloping layer of an elastic material covering the digits, the palm, and the spreading joints, wherein the digits, the palm, and the spreading joints are embedded in the material.

28. The mechanical hand of claim 27 wherein the spreading joints comprise:
   four finger attachment links to which the base of each mechanical finger is coupled to, at least three of the finger attachment links are rotatable finger attachment links coupled to the palm such that the finger attachment links can rotate around an axis normal to the face of the palm,
   at least three lever arms coupled to or part of the at least three rotatable finger attachment links extending from the at least three rotatable finger attachment links in a direction parallel to the front face of the palm, wherein each of the at least three lever arms is coupled to the palm through at least a primary lever link and a secondary lever link, and
   at least one lever link connector, the lever link connector coupled at a first end thereof to a secondary lever link of a first lever arm and at a second end thereof to a secondary lever link of a second lever arm, the first and the second lever arms being adjacent lever arms.

29. The mechanical hand of claim 28, further comprising:
   a cable connection point coupled to or part of a first secondary lever link,
   a cable routing point coupled to or part of a second secondary lever link,
   a cable routed through the cable routing point and coupled to the cable connection point such that tension can be applied between the cable routing point and the cable connection point by tensioning the cable to control an amount of spreading between at least two of the mechanical fingers.

30. The mechanical hand of claim 28, wherein the rotation of the mechanical fingers is such that at least one finger on a first end of the finger side of the palm rotates in the opposite direction to the direction that at least one finger on a second end on the finger side of the palm rotates.

\* \* \* \* \*